(12) United States Patent
Linsenmaier et al.

(10) Patent No.: US 8,395,514 B2
(45) Date of Patent: Mar. 12, 2013

(54) OPTICAL SYSTEM AND METHOD FOR DETECTING OPTICAL SYSTEM OBSCURATION IN A VEHICLE

(75) Inventors: Frank Linsenmaier, Weinstadt (DE); Daniel Wagner, Weinstadt (DE); Oliver Eder, Pinache (DE); Hans-Clemens Steffel, Stuttgart (DE)

(73) Assignee: SMR Patents S.a.r.l., Luxembourg (LU), 1

( * ) Notice: Subject to any disclaimer, the term of this patent is extended or adjusted under 35 U.S.C. 154(b) by 932 days.

(21) Appl. No.: 12/489,952

(22) Filed: Jun. 23, 2009

(65) Prior Publication Data

US 2009/0315723 A1    Dec. 24, 2009

(30) Foreign Application Priority Data

Jun. 24, 2008   (EP) ..................................... 08158859

(51) Int. Cl.
   *G08B 19/02* (2006.01)
(52) U.S. Cl. ......... 340/583; 340/580; 340/436; 340/945
(58) Field of Classification Search .................. 340/583, 340/580, 584, 435, 436, 437, 962, 945
   See application file for complete search history.

(56) References Cited

U.S. PATENT DOCUMENTS

| 4,538,064 | A | * | 8/1985 | Kovacs .......................... 340/583 |
| 5,416,476 | A | * | 5/1995 | Rendon .......................... 340/905 |
| 6,166,645 | A | * | 12/2000 | Blaney .......................... 340/583 |
| 6,429,933 | B1 | * | 8/2002 | Jackson, Jr. .................. 356/239.8 |
| 6,944,908 | B2 | * | 9/2005 | Hoetzer et al. ................ 15/316.1 |
| 7,050,949 | B2 | * | 5/2006 | Kokuryo et al. ............... 702/191 |
| 7,542,835 | B2 | * | 6/2009 | Takahama et al. ............ 340/435 |
| 7,652,584 | B2 | * | 1/2010 | Fridthjof ....................... 340/580 |
| 8,040,248 | B2 | * | 10/2011 | Fridthjof ....................... 340/580 |
| 2007/0267400 | A1 | | 11/2007 | Chen |
| 2010/0020170 | A1 | * | 1/2010 | Higgins-Luthman et al. ............................ 340/435 |

FOREIGN PATENT DOCUMENTS

| DE | 202005018498 | 3/2006 |
| EP | 0717446 | 6/1996 |
| EP | 1418089 | 10/2003 |
| WO | 2005033772 | 4/2005 |

OTHER PUBLICATIONS

European Search Report for application No. EP 0815 8859 dated Feb. 2, 2009.

* cited by examiner

*Primary Examiner* — Eric M Blount
(74) *Attorney, Agent, or Firm* — Reising Ethington P.C.

(57) ABSTRACT

An optical system is proposed which is configured to detect an obscuration of the optical components and to optionally initiate measures, which either warn the driver and/or activate a heater which reduces the detected obscuration of the image. The system is controlled by a method for detecting an obscuration, which comprises a high reliability for detecting obscurations through the evaluation of additional sensors.

7 Claims, 5 Drawing Sheets

OPTICAL SYSTEM AND METHOD FOR DETECTING OPTICAL SYSTEM OBSCURATION IN A VEHICLE

BACKGROUND OF THE INVENTION

The invention is based on a priority patent application EP 08158859.2 which is hereby incorporated by reference.

The invention relates to an optical system with the capability to detect an obscuration of the optical components, and to implement measures if required, which either warn the driver or activate a heater, which reduces the detected obscuration of the image.

PRIOR ART

New assistance functions for use in a driver assistance system are continuously being developed. One of these new assistance functions, which are to support the driver during a lane change, is designated as LCA, which stands for Lane Change Assistant. Also, in this assistance function, the ambient of the vehicle, in particular its rear or lateral portion, are in turn monitored by a suitable periphery sensor. Sensors based on radar, lidar or also image sensors can be used as periphery sensors. Said assistance function warns the driver during dangerous passing- and lane change processes. A critical situation is indicated to the driver, e.g., by an acoustic, optical or, haptic warning, or by a combination of such warnings. An intended lane change of the own vehicle is typically detected by the driver assistance system, in that the driver actuates the signal light, when initiating the lane change. Also, in a carefully planned and applied driver assistance system, a malfunction cannot be completely excluded, which malfunction becomes apparent through erroneous warnings or also through missed warnings. A prevalent reason for such a malfunction is an erroneous association of the objects detected in the traffic periphery of the vehicle. Said malfunction can have several reasons. Additional assistance functions support the driver during parking processes and when backing up the vehicle. Also, in these assistance functions, the driver assistance system is based on sensor signals, in particular from optical sensors and from ultrasound sensors. Another function, the so-called "bird view", facilitates the peripheral vision about the vehicle by means of optical sensors. The integration of various sensors into new functions and an improvement of the information provided to the driver increase more and more.

A prerequisite for the reliable use of optical sensors, which are used for image detection, is that the optical components exposed to the environmental conditions provide a reliable imaging of the periphery. In particular, in automotive applications, the sensors are exposed to normal environmental conditions. The assembly situation, e.g. of a dead angle monitoring system at the exterior mirror, cannot prevent objects from covering up the camera lens. Through airflows and chaotic turbulences about the vehicle, dirt particles are deposited on the optical components. Water spray and rain lead to the formation of drops on the lens. Temperature changes and different air humidity are the causes for the creation of contamination. In cold zones, ice can furthermore form on the lenses.

The cause for the optical dispersion is contamination, mostly comprised of water, e.g. dew or frost, or comprised of grime. Grime is comprised of other materials, like e.g. oil, grease or non-transparent solids, which can also be dissolved in water.

SUMMARY OF THE INVENTION

It is the object of the present invention to detect these overcast or obscured conditions, to identify them, and to initiate measures either to warn the driver and/or to at least partially remove the obscuration through a heater.

Various methods for detecting grime and drops are known from prior art, like e.g. from the unpublished EP 07 17 446. Herein, transmitter and receiver systems are used in the optical components for detection.

Camera sensors with a heatable cover pane are also known in the prior art. WO 2005/033772 describes a camera sensor, whose cover pane can be heated by a resistance heater.

The method according to the invention for detecting the optical obscuration of the sensor uses at least two sensors. Thus, the redundancy of a statement regarding the degree of obscuration and regarding the quality of the obscuration is increased. In particular for automotive safety systems, the increase of the safety in image recognition is essential. The use of the same sensor for image recognition and also for detecting the obscuration reduces the number of required components and can therefore keep the size of the component and the cost low.

Further advantages are recited in the dependent claims. The obscuration is advantageously detected from the actual image by an algorithm, which determines the grayscale distribution in the image. Thus, no additional sensor is required.

Another advantage is achieved in that a complete coverage of a sensor can be very easily detected by comparing the images of plural sensors.

DESCRIPTION OF THE EMBODIMENTS

Figure 1:
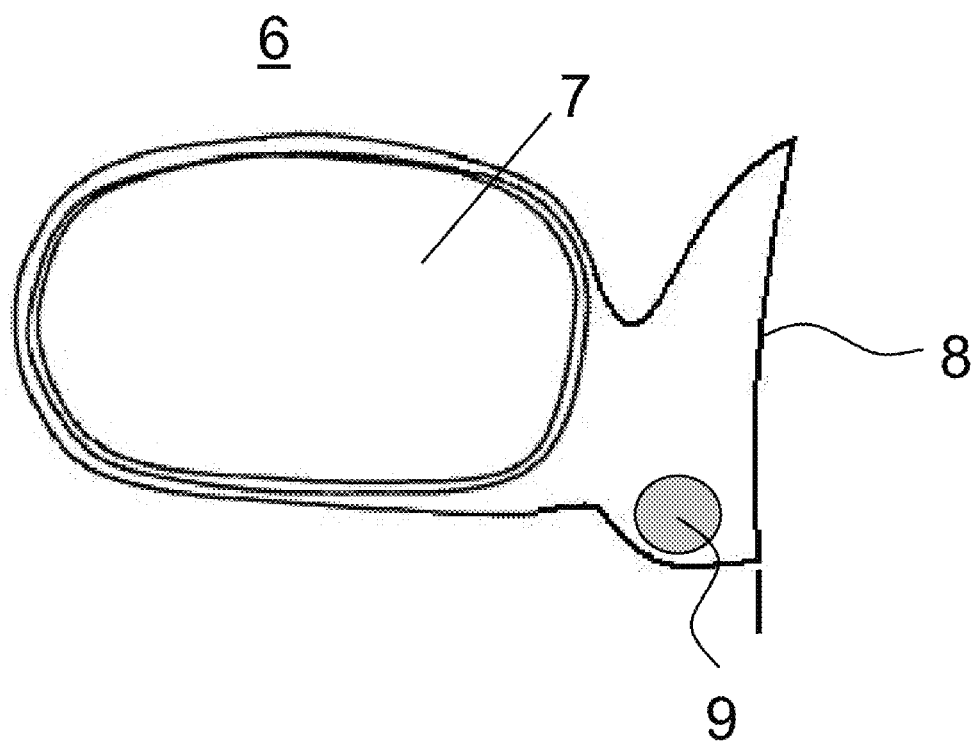
FIG. 1 shows an exemplary mounting location for a sensor for image recognition.

FIG. 1 shows an exemplary external vehicle mirror 6. The rearview mirror assembly is comprised of a mirror head and of a mirror base. The mirror itself is disposed in the mirror head. The mirror base is connected flush to the vehicle contour 8. An optical sensor 9 is mounted to the rearview mirror assembly, in this embodiment in the mirror base or at the mirror base. Any type of sensor, which can be used for image detection, can be used as an optical sensor.

The sensor in an embodiment, which is not illustrated, is installed in the mirror head or at the mirror head.

Figure 2:
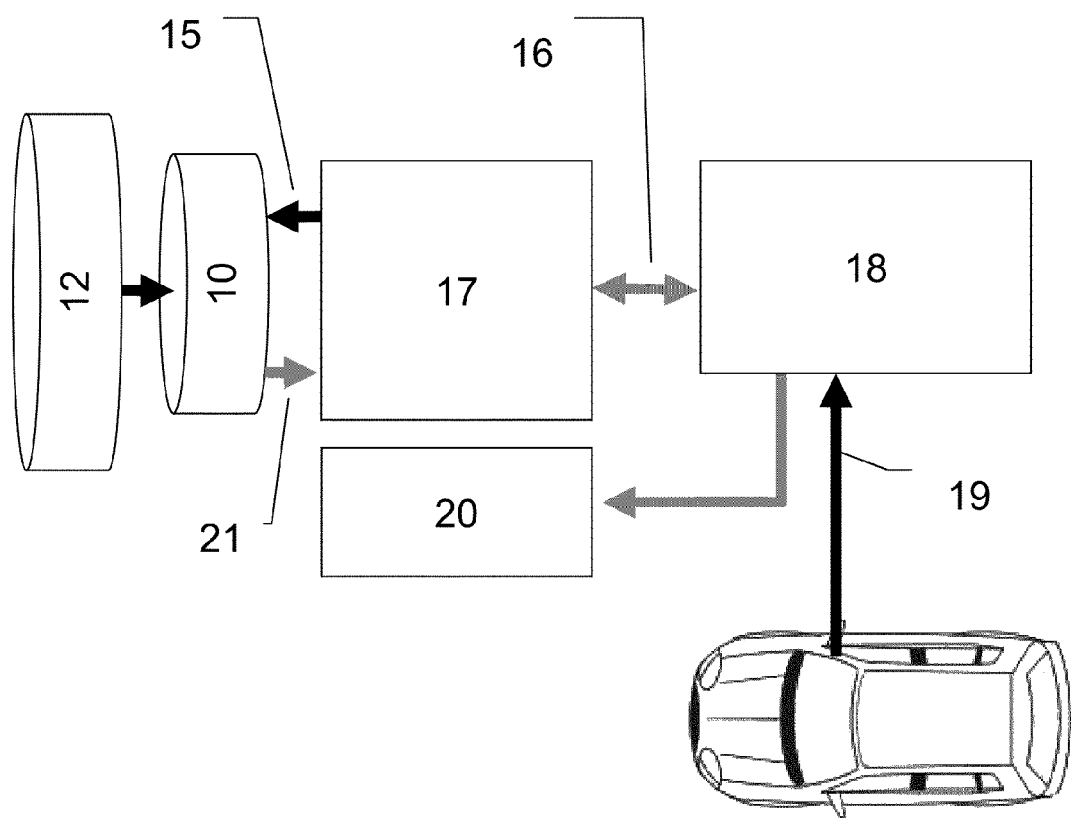
FIG. 2 shows an exemplary sensor configuration.

FIG. 2 schematically illustrates the configuration of the optical sensor system. An optical lens 12 is connected in front of a sensor chip 10. Said optical chip is connected to an image data connection 21 with an image processor 17, which is bidirectionally connected to a communication controller. Said communication controller 18 establishes the connection with additional controllers in the vehicle, e.g. through the vehicle bus, e.g. a LIN bus, CN bus, or Flexiray or through a particular communication conductor LVDS (Low Voltage Differential Signaling). The output unit 20 is addressed by the communication controller, either directly as stated in the embodiment, or through the vehicle bus system. The image processor in turn accesses the sensor chip through the sensor control connection. The output unit 20 can be a simple LED, which indicates the impairment of the optical components, or a warning in a display. The position and type of the display can be implemented in various manners, which a person skilled in the art would provide for such a display.

The system sketched out in FIG. 2 is used in the rearview mirrors on both sides of the vehicle. However, the principle can be implemented for each optical sensor, irrespective of its position at the vehicle.

In optically based sensor systems, information outside of the sensor system is captured as a principle, and the signal/interference ratio of the detected signal is evaluated through software. The detected image is projected from a three-dimensional world onto a two-dimensional image plane. In this method, it cannot be differentiated, if the detected grayscale characteristics and a possible lack of contrast have actually been caused by the detected image or if they are caused by a grime layer on the lens. The cause of the lack of contrast in an image cannot be detected unambiguously. Such a condition cannot be detected unambiguously by means of a passive camera system, which is considered a problem inherent to the system.

Figure 3:
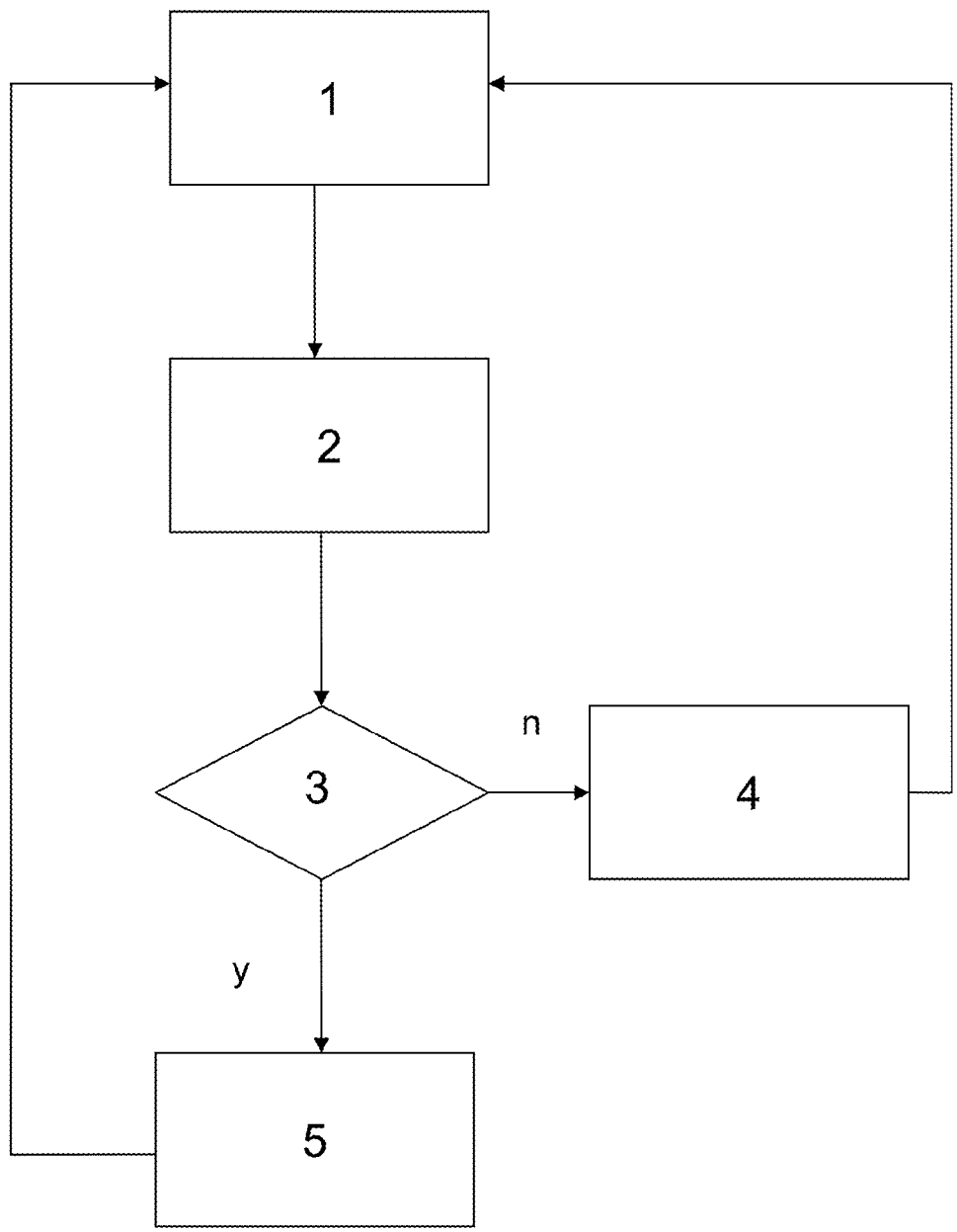
FIG. 3 shows an exemplary execution of a method.

The problem is addressed by a method according to FIG. 3. An image is captured in the first step of the method. Step 2 provides image recognition. Step 3 detects the fact that an obscuration or malfunction is present. In case of a positive decision regarding an obscuration, step 4 is initiated, which either means an indication of the malfunction or turning on a heater. The process is then started again by Step 1. When the decision regarding the malfunction detection 3 is negative, the display function and/or the heater function are terminated again, and the process starts again with step 1.

The malfunction detection 3 is the critical point in this method. A base algorithm in the image processor evaluates the contrast characteristics within the camera image and determines the gradient in order to determine a measure for the change of the contrast. The simplest case is a contamination with a limited area. In order to be able to detect said covered up condition, algorithms within the image search for gradients with a stepped characteristic of the grayscale distribution. When there is a "sudden" step in the image, and a transition of a stochastic grayscale distribution to a large surface grayscale field with a homogenous, coherent grayscale portion, the conclusion is justified that there is contamination on the lens.

In this case of an obscuration of the image, a decision can be made based on the evaluation of only one image sensor; however, also in this case, the comparison with a second image of a second image sensor increases the reliability of the decision. A "blocked camera algorithm" is used during a partial coverage, which image sensor detects the image data of the additional camera sensor as blocked and informs the driver regarding the blocking. The gradient of the grayscales in the image is determined. Said condition can be computed from the available image information, almost without "external help".

In order to increase the detection capability of a semitransparent contamination, a method of inter-camera communication is introduced, which facilitates to evaluate at least coarse brightness information from another camera system disposed at the vehicle. The camera systems exchange information regarding the day-/night operating mode by measuring the brightness. The information of the other respective camera system is used for the evaluation. A more reliable assertion becomes possible through the additional reference. Additional overcast and obscuration conditions can be derived from said additionally available information.

A total obscuration constitutes another special case. In case of a total overcast, the external help of the additional camera system is additionally used for the evaluation.

A semitransparent occlusion is the most complex form of contamination which has to be detected. This is the case when the optical components of the sensor system have fogged up or a frost layer has deposited on the lens. In order to be able to reliably detect said condition, the camera system uses the information of the other camera in order to additionally determine a conclusion regarding the cause of the lack of contrast through the operating condition of said other camera.

Since such conditions change slowly over time, a time function is considered additionally. When the lack of contrast is maintained over a measurement interval, an internal counter (blocked camera counter) is increased. When said counter exceeds a defined threshold and when the other camera also indicates a blockage as another function, the display system is triggered.

Figure 4:
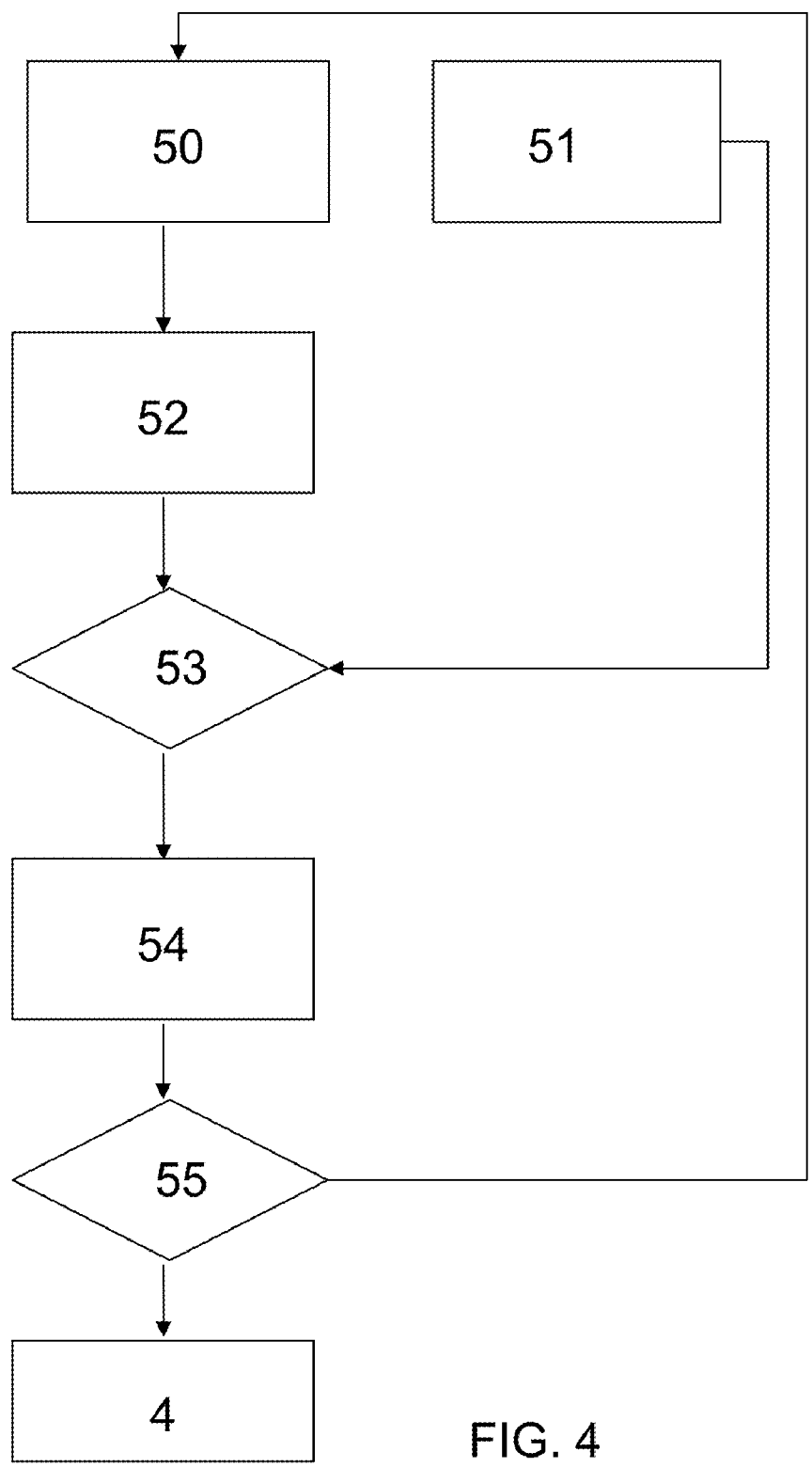
FIG. 4 shows an execution of a method for detecting the obscuration.

FIG. 4 shows the execution of a method for detecting an obscuration. The entire method corresponds to step 3 of FIG. 2.

A first image recognition 50 and a second image recognition 51 are used for reference. The method step 52 constitutes the grayscale detection, which initially provides a measure for the brightness in order to thus determine day or night. The grayscale detection 52 is connected to the next step, which is the grayscale comparison 53. It is determined in this step, if the values of the second image detection have to be used in addition. When an obscuration is present, the information of the additional sensor is used. In the next step, the counter 54 is accessed and increased by one increment. The image evaluation starts anew. As long as the obscuration remains or increases, the increment of the counter is increased up to a threshold value. When the threshold value is reached in step 55, the warning function of the display is triggered. Alternatively, or also simultaneously, a heater is activated. The counter 54 is not reset to zero, but it is set back by a certain number of increments, so that the measure can be effective over time. The counter 54 is set back to a second threshold value.

In order to reduce the effects caused by the weather conditions to a minimum, the light exit or light entry windows of optical sensors are provided with a heater. Contamination, which is comprised of pure water without grime particles mixed therein, is removed in the simplest manner by evaporating water or by sublimating ice under the influence of heat.

Contamination mostly occurs at the most exposed element, which constitutes the interface of the optical system with the ambient. In many cases, this is the illuminated pane or the most outward lens. The greatest temperature differences occur at said location.

Figure 5:
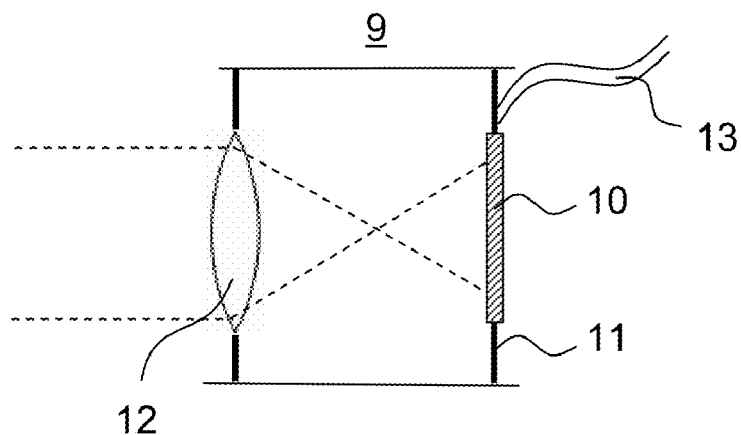
FIG. 5 shows an exemplary sensor with a heater.

FIG. 5 schematically illustrates an optical sensor 9 with an optical lens 12 and a with a sensor chip 10. The sensor chip is disposed on a circuit board 11 and connected to the vehicle through electrical connections 13.

Figure 6:
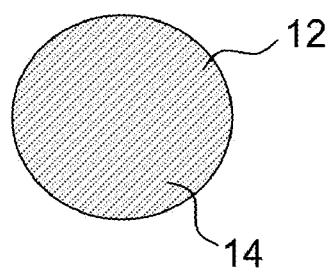
FIGS. 6 and 7 show two embodiments of the heater.

In order to be able to heat the optical element, it is advantageous to provide its entire surface with a heating resistor. The optical function of said element is not impaired, when said heating resistor is provided transparent for the light wave length range, in which the unimpeded light passage is required for the respective application. For the visible light wave length range and for near-infrared, the heating can be performed through a coating comprising ITO (indium tin oxide), tin oxide (SnO), aluminum doted zinc oxide (ZnO: AL), or fluor-doted tin oxide (FTO). Said exemplary array is described in FIG. 6. The optical lens 12 comprises a flat heating layer 14.

The heating resistor is placed as a surface element onto the entire surface required for the function of the optical element. In order for the heating resistor to have good adhesion on the surface of the optical element, where it is applied, a primer or adhesion enhancement layer can be applied up front. When glass is used as a material for the optical element, said layer can be comprised e.g. of silicon dioxide ($SiO_2$).

The feeding of electrical energy into the heating resistor can be performed by means of a conductor path, which is applied to the optical element to be heated in the same way as heating conductors on vehicle window heaters.

Figure 7:
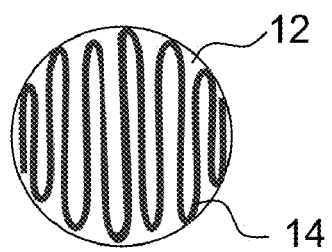

FIG. 7 illustrates an embodiment which shows heater windings on the optical element. Said heater meanders do not interfere with the image evaluation, since a shadowing, which may be present, is compensated by software.

The heating resistor can be applied to the outer most optical element on the inside and also on the outside. The contacting can be comprised of a spring contact or of a spring contact bar made of metal. Another option is the contacting by means of conductive deformable plastic materials.

The contacting can be performed by means of contacts, which are soldered on, or by means of conductors which are soldered on.

In order for the contacting elements to be able to be soldered on, suitable metal layers like e.g. copper (CU) are applied to the surface of the heating resistor.

When the heating resistor is applied to the outside of the outermost optical element, the power feed from the inside can be performed, so that the necessary adhesion-, passivation- and protective layers are routed about the edge of the optical element from the side facing away from the optical element (inner side) to the outer side.

The contacting can be routed by means of a conductive path from the inside to the outside. For the inside to be protected, the actual heater resistance is contacted in the portion of sealing and enclosure elements of the heatable optical element.

When the heating resistor is applied to the outside of the outermost optical element, a passivation layer for avoiding corrosion can be applied, depending on the material used. Said passivation layer can be comprised e.g. of silicon dioxide ($SiO_2$) or silicon nitride ($Si_3N_4$).

The passivation layers as well as the heating resistor layer can be part of an antireflective coating. An antireflective coating can also be additionally applied to the heating conductor layer when the layer thickness of the heating resistor does not deny its use as a component of an antireflection layer. The antireflection layer can e.g. be comprised of titanium dioxide ($TiO_2$), silicon dioxide ($SiO_2$) or silicon nitride ($Si_3N_4$).

A coating for increasing the scratch resistance can be applied as another possible layer. Said layer is applied after the heater is applied to the outside of a plastic illumination pane.

Since the materials used for the adhesion enhancement layer, the heating layer and the antireflection layer(s) are already relatively hard by themselves; they simultaneously provide a scratch resistant layer.

In order to reduce contamination, a hydrophilic coating is applied on the outside of the optical element in one embodiment. Said coating has the effect that no single drops but an evenly distributed moisture layer is provided on the surface. This film prevents that grime dissolved in the water or mixed with the water dries on the surface, and facilitates that it runs off with the water into the peripheral portion following gravity and that it is removed with the water runoff.

In order to reduce contamination, a hydrophobic coating is applied to the optical element on its most outward side. This has the effect that particular droplets, which are provided on the surface, have a very small contact surface with said surface. Said film prevents that grime dissolved in the water or mixed with the water dries on the surface, and it facilitates that it runs off into the peripheral portion and that it is removed with the water runoff.

REFERENCE NUMERALS AND DESIGNATIONS 1 image capture
2 image recognition
3 malfunction detection
4 start information/heater
5 stop information/heater
6 rearview mirror assembly
7 mirror
8 vehicle contour
9 optical sensor
10 sensor chip
11 circuit board
12 optical lens
13 connection
14 heater
15 sensor control
16 bidirectional connection
17 image processor
18 communication controller
19 bus system
20 output unit
21 image data
50 image recognition image 1
51 image recognition image 2
52 grayscale detection
53 grayscale comparison
54 counter
55 threshold detection

The invention claimed is:

1. A method for detecting an obscuration caused by the formation of condensation, icing or grime on an optical system of a vehicle, comprising at least two sensors for image capture, wherein the following steps are being performed: a) image capture by the first sensor b) image capture by the second sensor c) detection of an obscuration by measuring the grayscale distribution in the images captured by the two sensors d) initiation of a warning annunciation and/or heating of the optical system when an obscuration is detected.

2. A method according to claim 1, wherein the detection of an obscuration is controlled by a time characteristic.

3. A method according to claim 1, wherein the detection of the obscuration is optimized by a brightness comparison of the images captured by the first and second sensors.

4. An optical system for detecting an obscuration through the formation of condensation, icing and/or contamination of an optical system of a vehicle, wherein the optical system is comprised of at least two optical sensors for image capture with processors for image recognition and communication controllers, wherein an image capture can be performed respectively by the first sensor and by the second sensor, and wherein the detection of an obscuration can be performed by measuring the grayscale distribution in the captured images of the two sensors, and wherein information of additional optical sensors can be received through a vehicle network by means of the communication controllers, and wherein the optical system comprises a warning indicator and/or a heatable optical system, which is activated when the optical system is obscured.

5. An optical system according to claim 4, wherein a display is activated as driver information, when an obscuration is detected.

6. An optical system according to claim 4, wherein a heater of an optical lens of the optical system is activated when an obscuration is detected.

7. An optical system according to claim 4, wherein the processors include a counter, which is increased when the characteristic of a temporal change of the obscuration is detected.

* * * * *